US009763275B2

(12) United States Patent
Park et al.

(10) Patent No.: US 9,763,275 B2
(45) Date of Patent: Sep. 12, 2017

(54) METHOD AND APPARATUS FOR ESTABLISHING SHORT RANGE COMMUNICATION

(71) Applicant: Samsung Electronics Co., Ltd., Gyeonggi-do (KR)

(72) Inventors: Gwang-Ha Park, Seoul (KR); Do-Hun Kim, Seoul (KR); Jin-Ho Ahn, Gyeonggi-do (KR); Dai-IL Oh, Gyeonggi-do (KR); Jae-In Lee, Gyeonggi-do (KR); Hyun-Suk Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 33 days.

(21) Appl. No.: 14/453,451

(22) Filed: Aug. 6, 2014

(65) Prior Publication Data

US 2015/0044970 A1    Feb. 12, 2015

(30) Foreign Application Priority Data

Aug. 6, 2013 (KR) ......................... 10-2013-0093166

(51) Int. Cl.
*H04W 4/00* (2009.01)
*H04W 4/06* (2009.01)
(Continued)

(52) U.S. Cl.
CPC .......... *H04W 76/023* (2013.01); *H04B 10/11* (2013.01); *H04M 1/7253* (2013.01);
(Continued)

(58) Field of Classification Search
CPC ....... H04W 76/02; H04W 12/02; H04W 4/00; H04W 84/18; H04W 12/08; H04W 8/26;
(Continued)

(56) References Cited

U.S. PATENT DOCUMENTS 8,292,165 B2 * 10/2012 Adams ................. G06F 9/4411
                                                    235/380
9,531,764 B1 * 12/2016 McHugh ............. H04L 43/0811
(Continued)

FOREIGN PATENT DOCUMENTS

| EP | 1742421 A1 | 1/2007 |
| GB | 2427101 A | 12/2006 |
| WO | WO 2004/075169 A2 | 9/2004 |

OTHER PUBLICATIONS

Extended European Search Report dated Feb. 9, 2015 in connection with European Patent Application No. 14173821.1; 8 pages.
(Continued)

*Primary Examiner* — Bobbak Safaipour

(57) ABSTRACT

A method for establishing a short range connection includes transmitting a first data to an external device through infrared communication, the first data including information on a short range wireless communication other than the infrared communication, the short range wireless communication being supported by an electronic device, establishing the short range wireless communication with the external device on the basis of the first data, and transmitting a second data to the external device through the short range wireless communication. An electronic device includes at least one processor configured to transmit a first data to an external device through infrared communication, the first data including information on a short range wireless communication other than the infrared communication, the short range wireless communication being supported by an electronic device, establish the short range wireless communication with the external device on the basis of the first data.

20 Claims, 9 Drawing Sheets

(51) Int. Cl.
   *H04W 12/08* (2009.01)
   *H04W 8/24* (2009.01)
   *H04L 29/08* (2006.01)
   *H04W 76/02* (2009.01)
   *H04B 10/11* (2013.01)
   *H04M 1/725* (2006.01)
   *H04B 5/00* (2006.01)
   *H04W 8/00* (2009.01)
   *H04W 88/06* (2009.01)

(52) U.S. Cl.
   CPC ............ *H04W 4/008* (2013.01); *H04W 76/02* (2013.01); *H04B 5/00* (2013.01); *H04M 2250/04* (2013.01); *H04W 8/005* (2013.01); *H04W 88/06* (2013.01)

(58) Field of Classification Search
   CPC ...... H04W 4/008; H04W 88/06; H04L 29/06; H04L 67/04; H04L 67/104; H04L 67/1068; H04L 67/18; H04L 67/34; H04L 67/36; H04L 69/329; H04M 1/7253; H04B 1/3822; H04B 1/406; H04B 2215/068
   See application file for complete search history.

(56) References Cited

U.S. PATENT DOCUMENTS

| | | | |
|---|---|---|---|
| 2002/0126845 A1* | 9/2002 | Hue | G06Q 20/327 380/247 |
| 2005/0209769 A1* | 9/2005 | Yamashita | G08G 1/017 701/117 |
| 2006/0073788 A1* | 4/2006 | Halkka | H04W 48/16 455/41.2 |
| 2006/0146765 A1 | 7/2006 | Van De Sluis et al. | |
| 2006/0258406 A1* | 11/2006 | Igarashi | H04M 1/6066 455/567 |
| 2008/0024269 A1* | 1/2008 | Watanabe | G06K 19/0672 340/5.8 |
| 2008/0268814 A1 | 10/2008 | Asakura | |
| 2009/0124281 A1* | 5/2009 | Takamune | H04M 1/6066 455/550.1 |
| 2010/0061294 A1* | 3/2010 | Proctor, Jr. | G06Q 30/0623 370/328 |
| 2010/0144275 A1* | 6/2010 | Satou | H04W 12/06 455/41.2 |
| 2011/0136434 A1* | 6/2011 | Choi | H04W 84/18 455/41.2 |
| 2011/0161974 A1* | 6/2011 | Kurabayashi | G06F 9/5066 718/104 |
| 2012/0069838 A1* | 3/2012 | Sarkar | H04W 76/02 370/352 |
| 2012/0115503 A1* | 5/2012 | Lynch | H04L 67/16 455/456.1 |
| 2013/0091546 A1 | 4/2013 | Shen et al. | |
| 2013/0325407 A1* | 12/2013 | Lee | G06F 17/00 702/188 |
| 2014/0293829 A1* | 10/2014 | Visuri | H04L 12/145 370/254 |
| 2017/0105086 A1* | 4/2017 | Wesby | H04W 4/001 |

OTHER PUBLICATIONS

Foreign Communication from Related Counterpart Application; European Patent Application No. 14173821.1; European Office Action dated Jul. 11, 2017; 5 pages.

* cited by examiner

METHOD AND APPARATUS FOR ESTABLISHING SHORT RANGE COMMUNICATION

PRIORITY

The present application is related to and claims priority under 35 U.S.C. §119 to an application No. 10-2013-0093166 filed in the Korean Intellectual Property Office on Aug. 6, 2013, the contents of which are incorporated herein by reference.

TECHNICAL FIELD

Various embodiments of the present invention relate to an electronic device, and more particularly to a method and an apparatus for establishing a short range communication.

BACKGROUND

As mobile communication technologies develop, an electronic device is used as an individual's essential communication device. Furthermore, as the electronic device provides various enhanced services such as camera, data communications, video playback, audio playback, instant messaging, calendar, and alarm functions in addition to a voice communication function, various programs for performing the functions are used.

The electronic device may perform an input function through various input methods, or various objects, control another electronic device through various communication methods, or transmit/receive data to/from another electronic device.

Conventionally, when an electronic device is connected to another electronic device via a short range wireless communication, a user confirms device identification information on another electronic device and performs a selection operation and performs a plurality of operations while transmitting/receiving data. That is, this causes user inconvenience.

SUMMARY

A method for establishing a short range connection is provided. The method includes transmitting a first data to an external device through infrared communication, the first data including information on a short range wireless communication other than the infrared communication, the short range wireless communication being supported by an electronic device, establishing the short range wireless communication with the external device on the basis of the first data, and transmitting a second data to the external device through the short range wireless communication.

In some embodiments, the method further includes receiving a request configure to connect the short range wireless communication to the external device, transmitting a connection acceptance response to the external device in response to the request configure to connect the short range wireless communication.

In some embodiments, the first data further comprises identification information on the electronic device.

In some embodiments, the electronic device is configured to support a plurality of short range wireless communications and the first data includes information on the plurality of short range wireless communications.

In some embodiments, the plurality of short range wireless communications is prioritized configure to be established.

In some embodiments, the method further includes entering the first data into the electronic device through a predetermined input means.

In some embodiments, the predetermined input means is at least one of a touch pen, a motion of part of a body, and an accessory device.

In some embodiments, the first data further includes information on whether there is data that the electronic device transmits to the external device or whether there is data that the electronic device receives from the external device.

In some embodiments, the first data includes a connection request message to establish a connection through the short range wireless communication method that the electronic device provides.

In some embodiments, transmitting the second data further comprises automatically transmitting the second data once the short range wireless communication is connected.

A method for establishing a short range connection is provided. The method includes transmitting a first data to a first external device through infrared communication, the first data including information on a short range wireless communication other than the infrared communication, the short range wireless communication being supported by an electronic device, and establishing the short range wireless communication with a second external device on the basis of the first data, wherein the second external data is configured to receive the information on the short range wireless communication from the first external data.

An electronic device for establishing a short range connection is provided. The electronic device includes at least one short range wireless communication module configured to transmit and/or receiving data to and/or from the external device, a memory configured to store the data transmitted and/or received to and/or from the external device; and at least one processor configured to transmit a first data to an external device through infrared communication, the first data including information on a short range wireless communication other than the infrared communication, the short range wireless communication being supported by an electronic device, establish the short range wireless communication with the external device on the basis of the first data, and transmit a second data to the external device through the short range wireless communication.

In some embodiments, the at least one processor is configured to receive a request configure to connect the short range wireless communication to the external device, and transmit a connection acceptance response to the external device in response to the request configure to connect the short range wireless communication.

In some embodiments, the electronic device is configured to support a plurality of short range wireless communications and the first data includes information on the plurality of short range wireless communications.

In some embodiments, the first data is entered into the electronic device by a user.

In some embodiments, the first data is entered through at least one of a touch pen, a motion of a part of a body, and an accessory device.

In some embodiments, the first data includes information on whether there is data that the electronic device transmits to the external device or whether there is data that the electronic device receives from the external device as the first data.

In some embodiments, the first data comprises an instruction for establishing a connection through the short range wireless communication that the electronic device is configured to provide.

In some embodiments, the second data is automatically transmitted once the short range wireless communication is connected.

In some embodiments, the processor is configured to prioritize a plurality of short range wireless communications for connection according to at least one of information obtained by transmitting and/or receiving test data to and/or from the second external device, information on signal intensity between the electronic device and the second external device, information on a turned-on short range wireless communication module, and information on a pre-stored transmission speeds of short range wireless communications supported by the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
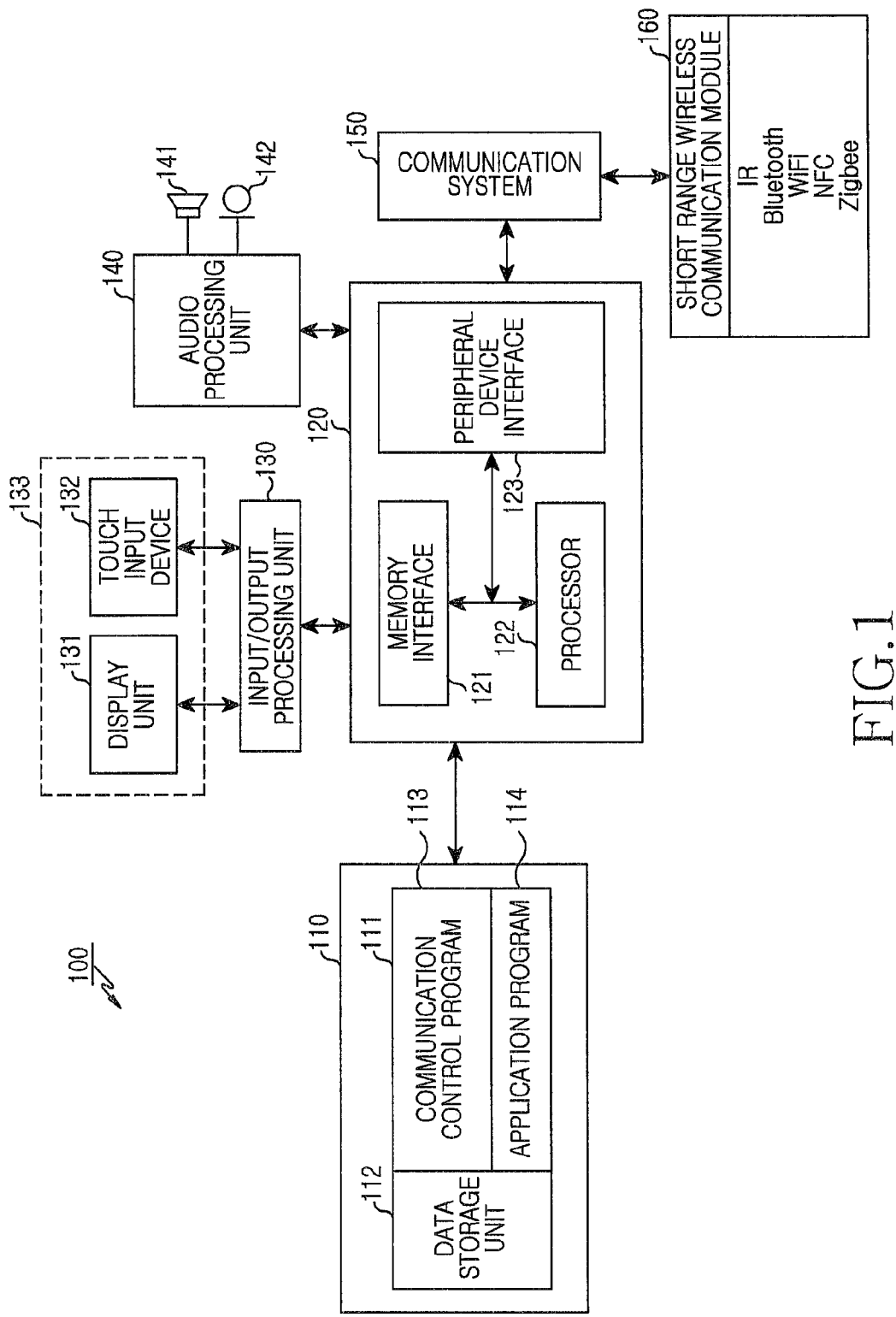
FIG. 1 is a block diagram illustrating an electronic device according to an embodiment of the present invention.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication technologies. According to various embodiments of the present invention, an electronic device may transmit at least one information for short range wireless communication environment establishment and/or at least one short rage wireless communication connection request and data including at least one information on data to be transmitted/received after short range wireless communication is connected by selecting the other party electronic device through an infrared (IR) communication method. The other party electronic device receiving the information may establish a short range wireless communication environment for transmitting/receiving data to/from the electronic device by requesting at least one short range wireless communication connection from the electronic device or accepting the received short range wireless communication connection request according to the received information. When the electronic device is connected to the other party electronic device through a short range wireless communication, it may automatically transmit data to the other party electronic device or may request data transmission.

According to various embodiments of the present invention, an electronic device automatically (i.e., without additional control) establishes a short range wireless communication environment through an IR communication method in order for transmitting data to the other party electronic device and includes instructions for automatically transmitting/receiving predetermined data through the established wireless communication.

Hereinafter, embodiments of the present invention will be described in more detail with reference to the accompanying drawings. In the following description, detailed descriptions of well-known functions or constructions will be omitted since they would obscure the invention in unnecessary detail. Also, the terms used herein are defined according to the functions of the present invention. Thus, the terms may vary depending on user's or operator's intentions or practices. Therefore, the terms used herein must be understood based on the descriptions made herein.

In describing various embodiments of the present invention, an electronic device may be described with a touch screen in which an input operation through an input device and a display operation through a display unit are performed on a physical one screen. In a device configuration of the present invention, a display unit and an input device may be separately displayed. However, the display may include the input device or the input device may include the display unit.

The present invention is not limited to an electronic device including a touch screen. That is, the present invention may be applied to various electronic devices including a physically separated display unit and an input unit or one of a display unit and an input unit. Hereinafter, an electronic device including a display unit including a display unit input device not including a touch screen touch input device including a touch input device and a display unit is described.

In the description below, an electronic device 100 can include mobile user devices, PDAs, PCs, laptops, smartphones, smart TVs, netbooks, mobile internet devices (MIDs), ultra mobile PCs (UMPCs), tablet PCs, mobile pads, media players, handheld computers, navigation systems, smart watches, HMDs, and MP3Ps.

In this disclosure below, when one component is referred to as being 'connected' or 'linked' to another component, it should be understood that the former can be 'directly connected or linked' to the latter or an intervening component can also be present. It will be further understood that when one component is referred to as being 'directly connected' or 'directly linked' to another component, it means that no intervening component is present.

FIG. 1 is a block diagram illustrating an electronic device according to an embodiment of the present invention. As shown in FIG. 1, the electronic device 100 can include a memory 110, a processor unit 120, and peripheral devices such as an input/output processing unit 130, a display unit 131, a touch input device 132, an audio processing unit 140, and a communication system 150.

The memory 110 can include a program storage unit 111 storing a program for controlling an operation of the electronic device 100 and a data storage unit 112 storing data generated during program execution and can store data generated from a program during an operation of the processor 122. According to an embodiment of the present invention, the electronic device 100 can predetermine operational information for controlling another electronic device, configure a table or list form of database, and store the operational information in the data storage unit 112.

According to an embodiment of the present invention, the electronic device 100 can configure a table or list form of database and can store a list for at least one another electronic device assigned with an authority for controlling the electronic device 100 in the data storage unit 112.

According to an embodiment of the present invention, the electronic device 100 can set an operation authorized for a control of another electronic device in each electronic device included in a list of authorized electronic devices and can configure a table or list form of database and can store the authorized operation in the data storage unit 112.

According to an embodiment of the present invention, the data storage unit 100 can store information (for example, identification information or identification information on peripheral devices) on an electronic device transmitting data including data transmitted/received through an infrared communication in an authorized device list.

The program storage unit 111 can include a communication control program 113 and at least one application program. Programs included in the program storage unit 111 can be configured with a set of instructions and expressed as an instruction set. The application program 114 can include a software component for at least one application program installed on the memory 110 of the electronic device 100.

The communication control program 113 can include at least one software component for controlling a communication with at least one another electronic device by using the communication system 150 or the short range wireless communication module 160. According to an embodiment of the present invention, the communication control program 113 can search for another electronic device in order for communication. If another electronic device for communication connection is found, the communication control program 113 can set a connection for communicating with another electronic device. Then, the communication control program 113 controls transmitting/receiving data to/from another electronic device through the communication system 150 by performing a performance search and a session establishment procedure with connected another electronic device.

The communication control program 113 can allow the third party electronic device receiving at least one short range wireless communication connection request or data on the basis of at least one information on the electronic device 100 establishing a short range wireless communication environment with another electronic device through an IR communication module or information for establishing a short range wireless communication environment so as to transmit data including at least one of instructions for controlling at last one short range wireless communication connection to the electronic device 100.

When the communication control program 113 receives at least one short range wireless communication connection request based on data transmitted through IR communication, it can accept the received at least one short range wireless communication connection request without an additional manipulation and can transmit/receive data to/from the other party electronic device requesting at least one short range wireless communication connection.

The communication control program 113 can determine automatically performing an instruction for controlling an operation in data transmitted or received through IR communication.

The memory 110 in the electronic device 100 can be at least one. The memory 110 can only serve as the program storage unit 111 or the data storage unit 112 or both the program storage unit 111 and the data storage unit 112 according to a purpose. The memory 110 may not have physical area distinction therein according to characteristics of an electronic device.

The processor unit 120 can include a memory interface 121, at least one processor 122, and a peripheral device interface 123. Here, the memory interface 121, at least one processor 122, and the peripheral device interface 123 included in the processor unit 120 can be integrated into at least one circuit and implemented separately.

The memory interface 121 can control an access from components such as the processor 122 or the peripheral device interface 123 to the memory 110.

The peripheral device interface 123 can control a connection between an input/output peripheral device of the electronic device 100 and the processor 122 and the memory interface 121.

The processor 122 controls providing various multimedia services from the electronic device 100 by using at least one software program, displays an UI operation of the electronic device 100 on the display unit 131 through the input/output processing unit 130, and provides a service for receiving an instruction from the outside of the electronic device 100 through the touch input device 132. The processor 122 controls providing a service corresponding program by executing at least one program stored in the memory 110.

The input/output processing unit 130 can provide an interface between the input/output device 133 such as the display unit 131 and the touch input device 132 and the peripheral device interface 123.

The display unit 131 receives state information on the electronic device 100, a character inputted from the outside, a video image or a still image from the processor unit 120 and configures an UI operation to display it through the input/output control unit 131.

The touch input device 132 can provide input data generated by a user's selection to the processor unit 120 through the input/output control unit 130. According to an embodiment of the present invention, the touch input device 132 can be configured only with a control button or a keypad to receive data for control from the outside of the electronic device 100.

According to an embodiment of the present invention, the touch input device 132 can provide input/output to the display unit 131 and the input/output device 133 to display it on one screen. In such a case, the touch input device 132 used in the input/output device 133 can use at least one of a capacitive method, a resistive film (pressure sensing) method, an IR method, an electromagnetic induction method, and an ultrasonic method.

According to an embodiment of the present invention, an input method of the touch input device 132 can include a method of inputting an instruction by directly touching the touch screen 133 and a method of inputting an instruction when an input means is placed within a predetermined distance from the touch screen 133. Terms such as hovering touch, floating touch, indirect touch, proximity touch or non-contact touch input can be used.

The input/output device 133, as a device physically combining the touch input device 132 with the display unit 131 on one screen, can be a touch screen displaying an operation of the electronic device 100 and inputting an instruction by touching a screen configuration. The touch screen can serve as the display unit 131 displaying an UI operation of the electronic device 100 and the touch input device 132 inputting an external instruction to the electronic device 100, so that is can be configured as the touch screen 133 including the display unit 131 and the touch input device 132. In the present invention, the touch screen 133 including a multi touch panel with a touch panel and a pen touch panel is shown and described mainly. The touch screen 133 of the electronic device 100 is not limited to a touch screen configured with a multi touch panel and thus, a touch screen including a pen touch panel where only pen touch is possible can be used also.

The audio processing unit 140 can provide an audio interface between a user and the electronic device 100 through a speaker 141 and a microphone 142.

The communication system 150 performs a communication function. According to an embodiment of the present invention, the communication system 150 can perform a communication with another electronic device by using at least one of mobile communication using a base station, wired communication, and satellite communication, and can be connected to the short range wireless communication module 160 to perform short range wireless communication.

According to an embodiment of the present invention, the short range wireless communication module 160 can perform a communication with another electronic device by using at least one short range wireless communication (for example, IR communication, Bluetooth communication, the Bluetooth low energy (BLE) communication, Wi-Fi communication, NFC wireless communication, Zigbee communication, and UWB communication), wireless LAN communication, and wired communication According to an embodiment of the present invention, the communication system 150 and the short range wireless communication module 160 are described separately. However, the communication system 150 and the short range wireless communication module 160 can perform a communication in one communication system module. In describing various embodiments of the present invention, an IR communication module and a short range wireless communication module can be separately described.

Although not shown in the drawings, at least one program or component of the electronic device 100 can perform an operation by at least one control module (not shown) controlled by the processor 122.

In describing an embodiment of the present invention, a display on the electronic device 100 or an output to the electronic device 100 can be a term referring to a method of displaying a video, a still image or a GUI operation on the touch screen 133 of the electronic device 100 or outputting a signal sound or a voice audio to the speaker 141. The term such as display or output can be used with the same meaning in the description below and if it needs to be distinguished, the term can be described separately.

In describing various embodiments of the present invention, the electronic device 100 can perform a role of at least one another electronic device (for example, a first electronic device, a second electronic device, or a third electronic device). According to various embodiments of the present invention, at least one another electronic device (for example, a first electronic device, a second electronic device, or a third electronic device) can be configured including a device identical or similar to the electronic device 100 or part of the electronic device.

FIGS. 2A to 2D are views illustrating an operation for transmitting/receiving data in an electronic device according to an embodiment of the present invention.

Figure 2A:
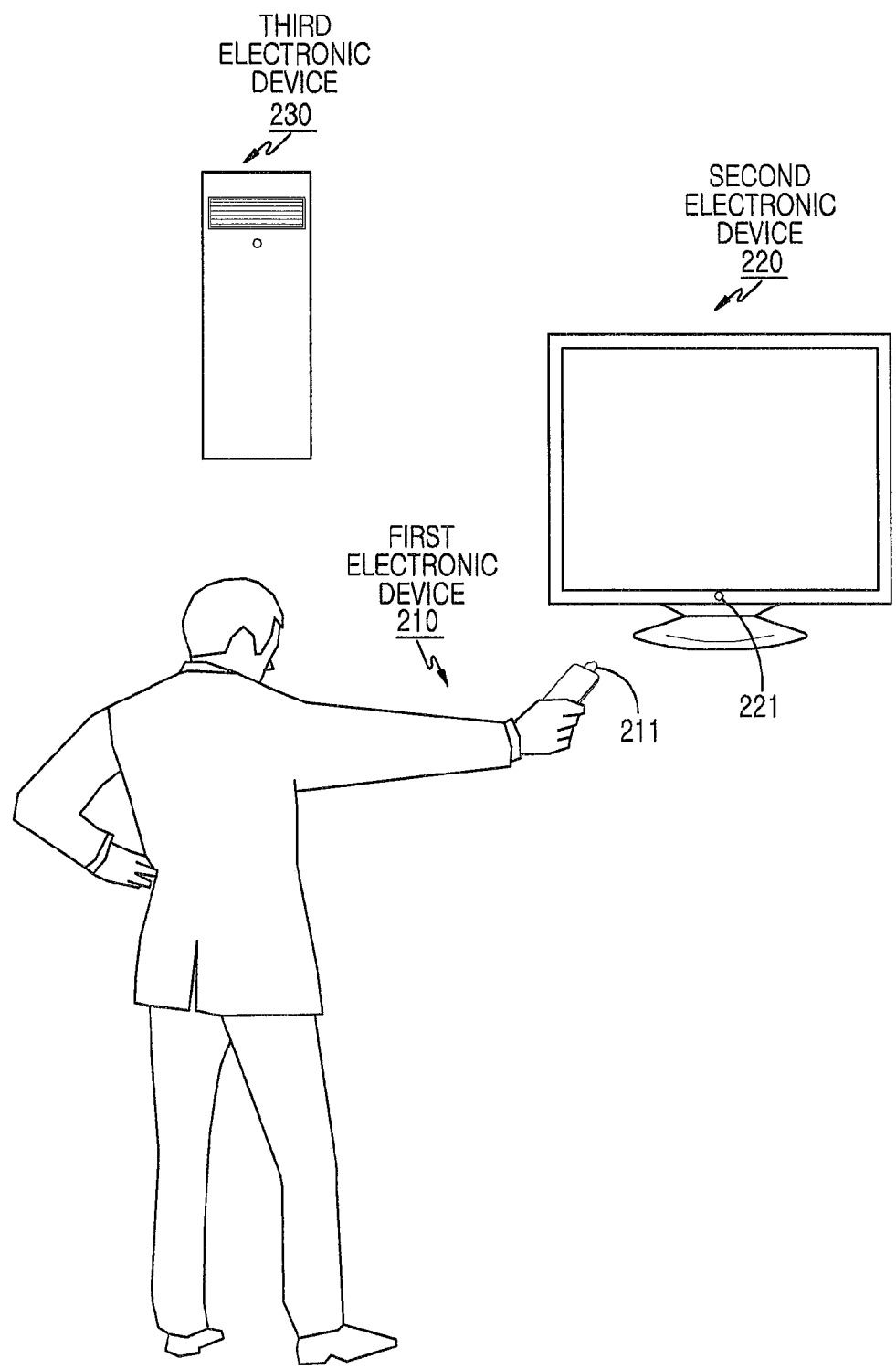
FIGS. 2A to 2D illustrate an operation for transmitting/receiving data in an electronic device according to an embodiment of the present invention.
Figure 2B:
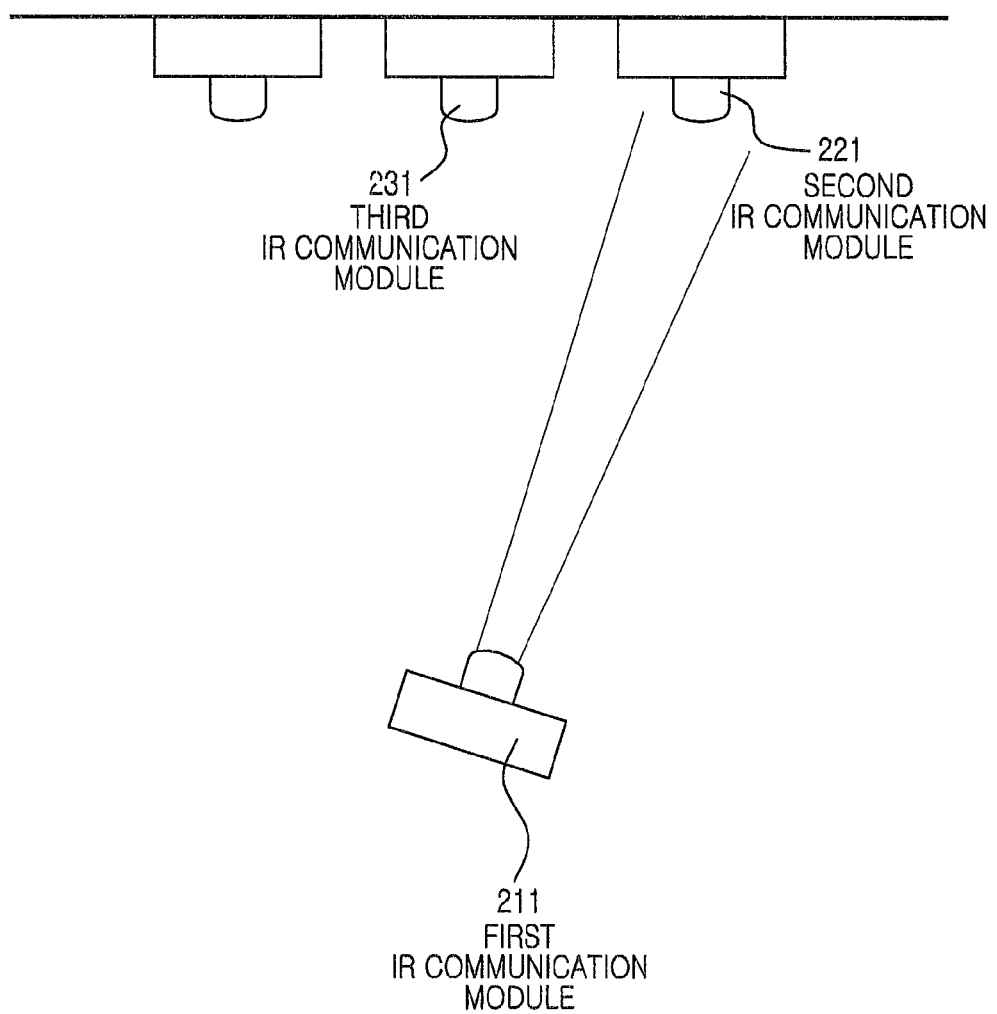
Figure 2C:
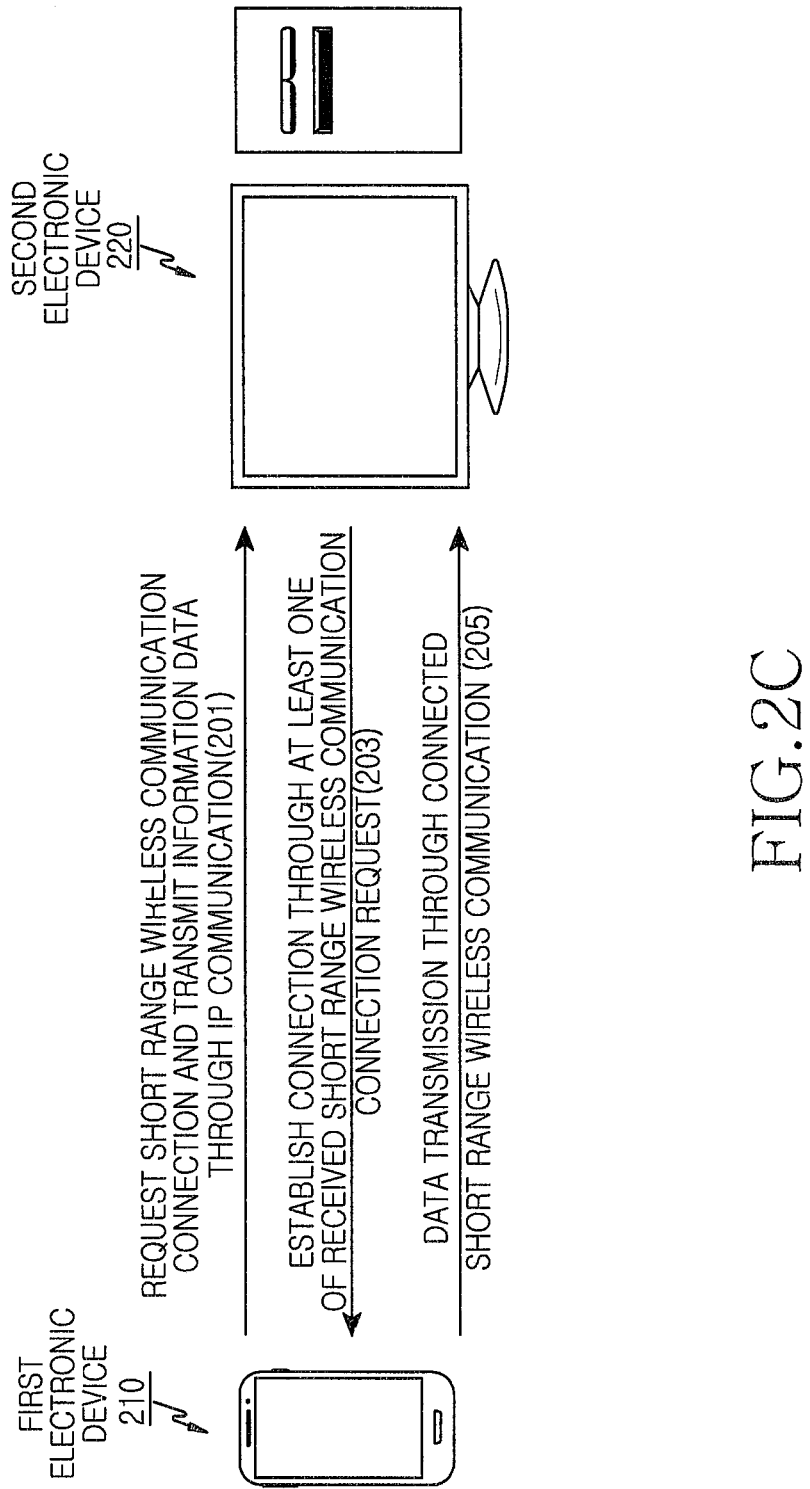

The electronic device 100 can transmit/receiving data for short range wireless communication environment establishment with another electronic device through IR communication and can establish a short range wireless communication environment on the basis of the transmitted/received data and can transmit/receive data through a short range wireless communication. Referring to FIGS. 2A to 2C, in describing various embodiments of the present invention, the electronic device 100 transmitting data to establish a short range wireless communication environment can be referred to as a first electronic device 210 and the electronic device 100 receiving the transmitted data for establishing a short range wireless communication environment can be referred to as a second electronic device 220.

Hereinafter, description is made with reference to FIG. 2A.

According to various embodiments of the present invention, the first electronic device 210 can transmit to the second electronic device 220 through IR communication the data including at least one of information on short range wireless communication connection that the first electronic device 210 includes, short range wireless communication connection request information, and information on data that the first electronic device 200 transmits to a target electronic device, by performing a predetermined operation. The first electronic device 210 includes an operation for moving an IR module in the first electronic device 210 toward the second electronic device 220 transmitting data as a predetermined operation for transmitting data and can include at least one of an operation for inputting a predetermined gesture on a touch screen of the first electronic device 201, an operation for inputting data to a button or an input device of the first electronic device 210, and an operation for performing a predetermined motion by moving the first electronic device 210.

The first electronic device 200 can transmit data to the second electronic device 22 through IR communication by performing a predetermined operation. The data that the first electronic device 210 transmits can be transmitted toward the second electronic device 200 by an operation toward the second electronic device 200. According to an embodiment of the present invention, the second electronic device 220 toward the IR module of the first electronic device 210 can receive data that the first electronic device 210 transmits and the data is not transmitted toward the third electronic device 220 that does not face the first electronic device 210.

According to an embodiment of the present invention, an operation for transmitting data from the first electronic device 210 to the second electronic device 220 through IR communication can be an operation for determining a communication environment available for transmitting a large amount of data. The IR communication can transmit/receive a small amount of data (for example, the size not exceeding 1 kbyte or 10 kbyte) including short rage wireless communication connection information on the first electronic device 210 and the second electronic device 200. The first electronic device 210 can transmit data including information configure to connect to a short range wireless communication (for example, Bluetooth communication, Wi-Fi communication, NFC communication, and Zigbee communication) available for the first electronic device 100 and a connection request of each short range wireless communication available when accepted by the second electronic device 220. The second electronic device 220 can accept at least one of the short range wireless communication connection requests of the first electronic device 210 by referring to the information on a short range wireless communication connection request, the information on a wireless short range wireless communication (for example, Bluetooth communication, NFC communication, Zigbee communication, and UWB communication) available for the second electronic device 220, and a short range wireless communication environment. When the first electronic device 100 can be connected to the second electronic device 220 through a short range wireless communication (for example, at least one of Bluetooth communication, NFC communication, and Zigbee communication), it can transmit a large amount of data.

Hereinafter, description is made with reference to FIG. 2B.

An IR communication module in the first electronic device 210 can transmit/receive data through light instead of radio waves. According to the characteristics of light, a communication signal including data has a straightness and thus is delivered within a narrow range of less than about 30°. Also, data transmission is impossible when the signal transmission distance exceeds about 10 m. According to an embodiment of the present invention, when the first electronic device 210 transmits/receives data through IR communication having the above features, it can transmit data to the specific second electronic device 220 through IR communication, and also can establish a 1:1 communication environment by connecting a short range wireless communication between the first electronic device 210 and the second electronic device 220 on the basis of the transmitted data information.

A signal having a straightness, transmitted from the first electronic device 210 to the first IR communication module 211, can control the position and direction of the first IR communication module 211 so as to allow the second IR communication module 221 of the second electronic device 220 to receive the signal. According to an embodiment of the present invention, the first electronic device 210 performs an operation for moving toward the second electronic device 220 that is to receive data, so that it can select a specific electronic device in order for data transmission. Referring to FIG. 2B, when the second IR communication module 221 of the second electronic device 220 and the third IR communication module 231 of the third electronic device 230 are disposed in parallel (or not disposed in parallel), as the second IR communication module 221 of the second electronic device 220 is pointed to the first IR communication module 211 of the first electronic device 210, data transmitted through IR communication from the first electronic device 210 can be transmitted to the facing second electronic device 220 according to a communication available range of the IR communication module. When the third IR communication module 231 of the third electronic device 230 is not disposed facing the first IR communication module 211, data transmitted through the first IR communication module 211 may not be received. According to an embodiment of the present invention, IR communication can receive/transmit data including data with a predefined instruction without a pairing operation for setting a communication environment such as a short range wireless communication (for example, Bluetooth communication, Wi-Fi communication, and S beam communication), and according to a limited direction and a signal transmission distance range, can serve as a switch for controlling establishing a communication environment between specific electronic devices.

Hereinafter, description is made with reference to FIG. 2C.

In operation 201, the first electronic device 210 can allow the first IR communication module 211 to face the position and direction where data can be transmitted to or received from the second IR communication module 221 of the second electronic device 220. The first electronic device 210 can accept at least one of a plurality of short range wireless communication connection requests transmitted from the second electronic device 220 to the first electronic device 210 and thus can configure data to connect (for example, pairing) the first electronic device 210 to the accepted at least one short range wireless communication and transmit the configured data. According to an embodiment of the present invention, the first electronic device 210 can configure data with a predetermined instruction for transmitting/receiving data to/from the second electronic device 220 through an IR module and then transmitting the configured data including identification information on at least one short range communication method available for the first electronic device 210, connection information, or at least one short range wireless communication connection request information to the second electronic device 220, so as to connect to a short wireless communication that the second electronic device 220 accepts.

According to various embodiments of the present invention, the first electronic device 210 can transmit request information to the second electronic device 220 so that the second electronic device 220 can transmit information on a short range wireless communication method of the second electronic device 220 necessary configure to connect to the second electronic device 220 through at least one short range wireless communication method. According to an embodiment of the present invention, if there is no connection history through Bluetooth communication between the first electronic device 210 and the second electronic device 220, connection information necessary for Bluetooth communication including information requested to the second electronic device 220 can be transmitted.

In operation 203, the second electronic device 220 can establish a short range wireless communication environment between the first electronic device 210 and the second electronic device 220 by accepting a connection request on at least one short range wireless communication methods available for the first electronic device 210 and the second electronic device 220 on the basis of the data received from the first electronic device 210.

According to an embodiment of the present invention, the second electronic device 220 can determine a connection priority of at least one short range communication method available for the first electronic device 210. According to an embodiment of the present invention, the second electronic device can confirm a response by transmitting test data (for example, packet data) to check a short range wireless communication environment and can confirm a signal intensity in the case of a communication method having a connected history. The second electronic device 220 can determine a priority of a short range wireless communication method configure to connect to the first electronic device 110 through at least one information among confirmed information.

According to various embodiments of the present invention, when information on at least one short range wireless communication available for the second electronic device 220 is requested from the first electronic device 210, the second electronic device 220 can transmit requested information. The second electronic device 220 can transmit information requested from the first electronic device 210 through IR communication. According to an embodiment of the present invention, as the second electronic device 220 is connected to the first electronic device 210 through Wi-Fi communication, if there is no information requested for Wi-Fi communication connection with the second electronic device 220 from the first electronic device 210, the second electronic device 220 can be connected to the first electronic device 210 through Wi-Fi communication by accepting a Wi-Fi communication connection request from the first electronic device 210. According to an embodiment of the present invention, as the second electronic device 220 is connected to the first electronic device 210 through Bluetooth communication, if there is information requested for Wi-Fi communication connection with the second electronic device 220 from the first electronic device 210, the second electronic device 220 can accept a Bluetooth communication connection request from the first electronic device 210 and can transmit requested information to the first electronic device 210. The first electronic device 210 can receive and apply the information requested to the second electronic device and can be connected to the second electronic device 220 through Wi-Fi communication.

In operation 205, the first electronic device 210 can transmit data or request data transmission through at least one short range communication method available for the second electronic device 220. According to an embodiment of the present invention, when transmitting data to the second electronic device 220, the first electronic device 210 can use at least one short range communication method available for the second electronic device 220. According to an embodiment of the present invention, when requesting data transmission from the second electronic device 220, the first electronic device 210 can use at least one short range communication method available for the second electronic device 220 or an IR communication method. A method of the first electronic device 210 to request data transmission from the second electronic device 220 can be method of transmitting data including information for requesting data transmission.

Figure 2D:
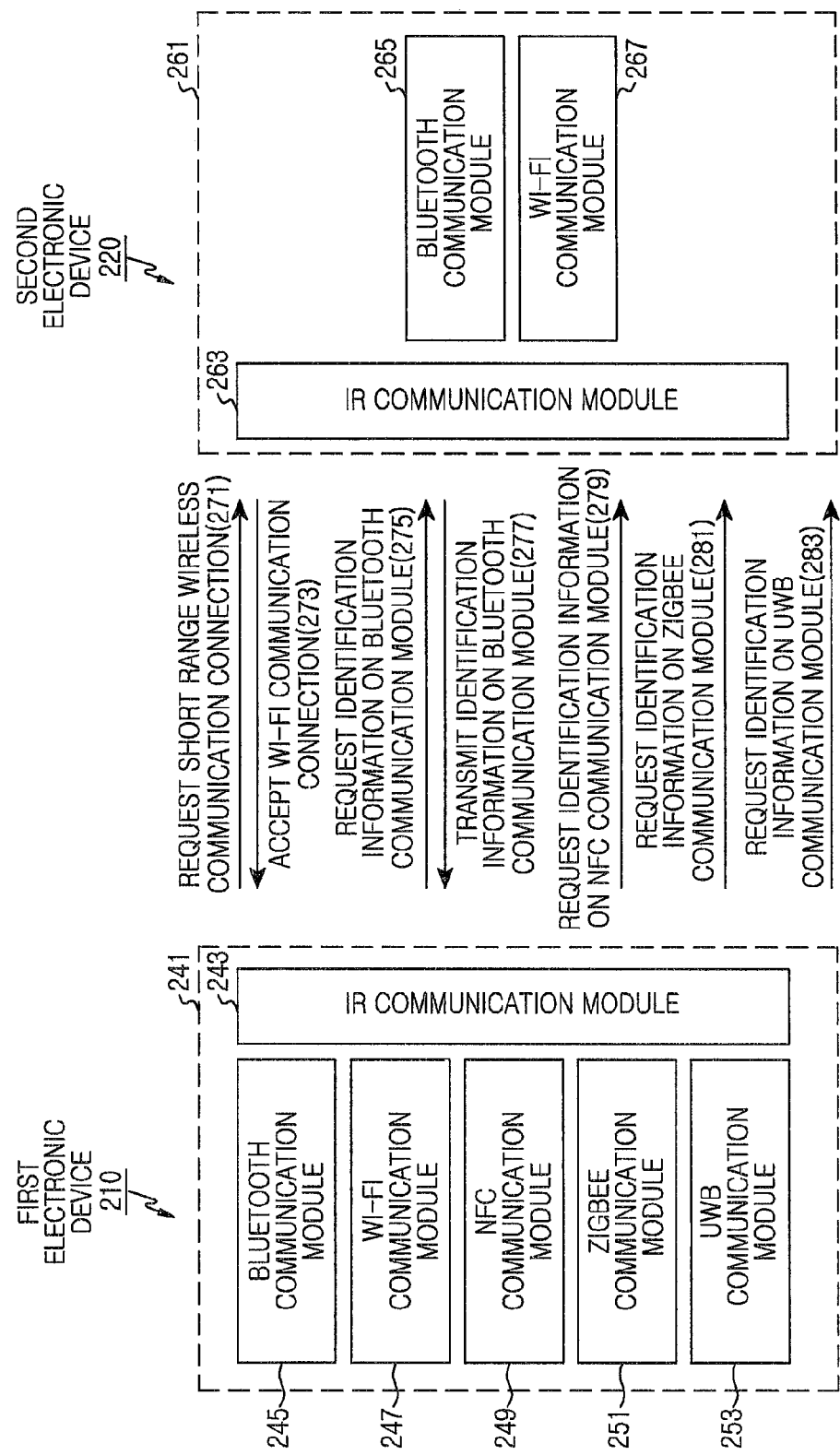

Hereinafter, description is made with reference to FIG. 2D.

According to various embodiments of the present invention, the first electronic device 210 and the second electronic device 220 can include at least one short range communication module connected to a communication system. According to an embodiment of the present invention, the first electronic device 210 can include an IR communication module 243, a Bluetooth communication module 245, a Wi-Fi communication module 247, an NFC communication module 249, a Zigbee communication module, and a UWB communication module 253. The first electronic device 210 can include at least one of the above-mentioned communication modules in the communication system 241 or can connect it to the communication system 241.

According to an embodiment of the present invention, the second electronic device 220 can include an IR communication module 263, a Bluetooth communication module 265, and a Wi-Fi communication module 267. The second electronic device 220 can include at least one of the above-mentioned communication modules in the communication system 261 or can connect it to the communication system 241.

According to various embodiments of the present invention, the first electronic device 210 can transmit data to the second electronic device 220 through IR communication. The transmitted data can be data including information on the first electronic device 210 configure to connect to the second electronic device 220 through at least one short range wireless communication or an instruction for allowing the second electronic device 220 to control connecting to the first electronic device 210 through at least one short range wireless communication.

According to an embodiment of the present invention, if the first electronic device 210 has a Wi-Fi communication history with the second electronic device 220, it can Wi-Fi connection request information in the data.

According to an embodiment of the present invention, if the first electronic device 210 has no Bluetooth communication history with the second electronic device 220, it may not check identification information for requesting a connection from the second electronic device 220 through Bluetooth communication. The first electronic device 210 can include request information on information necessary configure to connect to the second electronic device 220 through Bluetooth communication in the data. According to an embodiment of the present invention, the first electronic device 210 can include information on the first electronic device 210 necessary configure to connect to the second electronic device 220 through Bluetooth communication and information for allowing the second electronic device 220 to control requesting a connection from the first electronic device 210 through Bluetooth communication in the data.

According to an embodiment of the present invention, if the first electronic device 210 has no NFC communication history with the second electronic device 220, it may not check identification information for requesting a connection from the second electronic device 220 through NFC communication. The first electronic device 210 can include request information on information necessary configure to connect to the second electronic device 220 through NFC communication in the data. According to an embodiment of the present invention, the first electronic device 210 can include information on the first electronic device 210 necessary configure to connect to the second electronic device 220 through NFC communication and information for allowing the second electronic device 220 to control requesting a connection from the first electronic device 210 through NFC communication in the data.

According to an embodiment of the present invention, if the first electronic device 210 has no Zigbee communication history with the second electronic device 220, it may not check identification information for requesting a connection from the second electronic device 220 through Zigbee communication. The first electronic device 210 can include request information on information necessary configure to connect to the second electronic device 220 through Zigbee communication in the data. According to an embodiment of the present invention, the first electronic device 210 can include information on the first electronic device 210 necessary configure to connect to the second electronic device 220 through Zigbee communication and information for allowing the second electronic device 220 to control requesting a connection from the first electronic device 210 through Zigbee communication in the data.

According to an embodiment of the present invention, if the first electronic device 210 has no Bluetooth communication history with the second electronic device 220, it may not check identification information for requesting a connection from the second electronic device 220 through Bluetooth communication. The first electronic device 210 can include request information on information necessary configure to connect to the second electronic device 220 through UWB communication in the data. According to an embodiment of the present invention, the first electronic device 210 can include information on the first electronic device 210 necessary configure to connect to the second electronic device 220 through UWB communication and information for allowing the second electronic device 220 to control requesting a connection from the first electronic device 210 through UWB communication in the data.

According to various embodiments of the present invention, the second electronic device 220 can connect to the first electronic device 210 through at least one short range wireless communication on the basis of the data received through IR communication.

According to various embodiments of the present invention, the second electronic device 220 can confirm a short range wireless communication connection request through a Wi-Fi communication method on the basis of the received data and can be connected to the first electronic device 210 through Wi-Fi communication by accepting the connection request. The second electronic device 220 can confirm the identification code of the first electronic device 210 from the data received through IR communication. When the confirmed identification code is configured with information (for example, a whitelist) for automatically approving a connection request of a short range wireless communication (or Wi-Fi communication) from the first electronic device 210 and is included in a memory of the second electronic device 220, the second electronic device 220 can automatically accept a connection request through Wi-Fi communication. When the second electronic device 220 is connected to the first electronic device 210 through Wi-Fi communication, if information on the first electronic device 210 is required, the second electronic device 220 can confirm necessary information from the data received through IR communication.

According to various embodiments of the present invention, the second electronic device 220 can confirm a short range wireless communication connection request through a Bluetooth communication method on the basis of the received data and can be connected to the first electronic device 210 through Bluetooth communication by accepting the connection request. The second electronic device 220 can confirm the identification code of the first electronic device 210 from the data received through IR communication. When the confirmed identification code is configured with information (for example, a whitelist) for automatically approving a connection request of a short range wireless communication (or Bluetooth communication) from the first electronic device 210 and is included in a memory of the second electronic device 220, the second electronic device 220 can automatically accept a connection request through Bluetooth communication. When the second electronic device 220 is connected to the first electronic device 210 through Bluetooth communication, if information on the first electronic device 210 is required, the second electronic device 220 can confirm necessary information from the data received through IR communication. According to an embodiment of the present invention, as the second electronic device 220 confirms at least one information transmission request for the second electronic device 220 necessary configure to connect to the first electronic device 210 through Bluetooth communication on the basis of the data received through IR communication, it can transmit the requested information to the first electronic device 210 through at least one of IR communication, at least one previously connected short range wireless communication, and mobile communication.

According to an embodiment of the present invention, the second electronic device 220 can confirm a short range wireless communication connection request through an NFC communication method on the basis of the received data and may not provide a short range wireless communication through an NFC communication method. The second electronic device 220 can transmit to the first electronic device 210 at least one of message data on no response for a short range wireless communication connection request through an NFC communication method or no confirmation for NFC communication and data including error code.

According to an embodiment of the present invention, the second electronic device 220 can confirm a short range wireless communication connection request through an NFC communication method on the basis of the received data and may not provide a short range wireless communication through an NFC communication method. The second electronic device 220 can transmit to the first electronic device 210 at least one of message data on no response for a short range wireless communication connection request through an NFC communication method or no confirmation for NFC communication and data including error code.

According to an embodiment of the present invention, the second electronic device 220 can confirm a short range wireless communication connection request through a Zigbee communication method on the basis of the received data and may not provide a short range wireless communication through a Zigbee communication method. The second electronic device 220 can transmit to the first electronic device 210 at least one of message data on no response for a short range wireless communication connection request through a Zigbee communication method or no confirmation for Zigbee communication and data including error code.

According to an embodiment of the present invention, the second electronic device 220 can confirm a short range wireless communication connection request through a UWB communication method on the basis of the received data and may not provide a short range wireless communication through a UWB communication method. The second electronic device 220 can transmit to the first electronic device 210 at least one of message data on no response for a short range wireless communication connection request through a UWB communication method or no confirmation for UWB communication and data including error code.

According to various embodiments of the present invention, the first electronic device 210 and the second electronic device 220 can transmit/receive data through at least one wireless communication. According to an embodiment of the present invention, if an operation configure to connect to at least one short range wireless communication includes information on data that is to be transmitted/received through a short range wireless communication in the data transmitted/received through IR communication, the data can be automatically transmitted/received.

According to various embodiments of the present invention, the operations described with reference to FIGS. 2A to 2D can be performed without additional control on the basis of the data transmitted from the first electronic device 210 to the second electronic device 220. In order to connect to at least one short range wireless communication without additional control on the basis of the data transmitted from the first electronic device 210 or the second electronic device 220 through IR communication and transmit or receive predetermined data, the data transmitted/received through IR communication can include at least one of identification information on the first electronic device 210 transmitting data or identification information on at least one short range wireless communication, an instruction for allowing the second electronic device 220 receiving the data through IR communication to connect to the first electronic device 210 through at least one of information on a short range wireless communication method in the data, and information on the transmitted/received data when a short range wireless communication is connected.

Figure 3A:
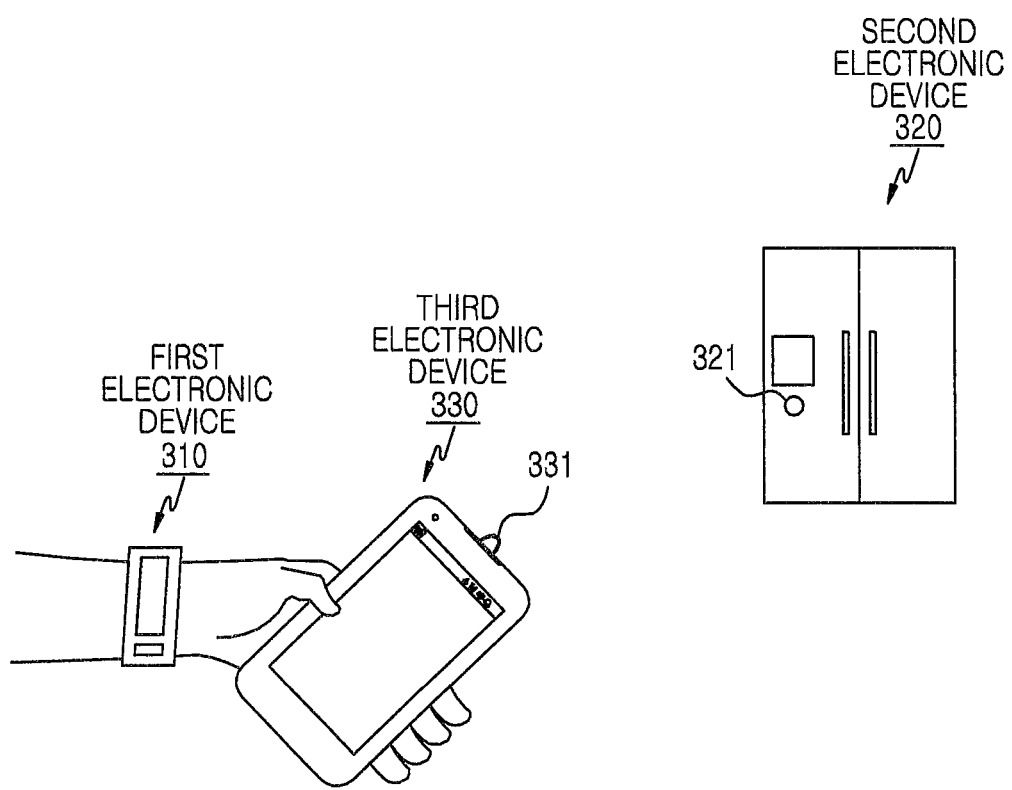
FIGS. 3A and 3B illustrate an operation for transmitting/receiving data in an electronic device according to an embodiment of the present invention.
Figure 3B:
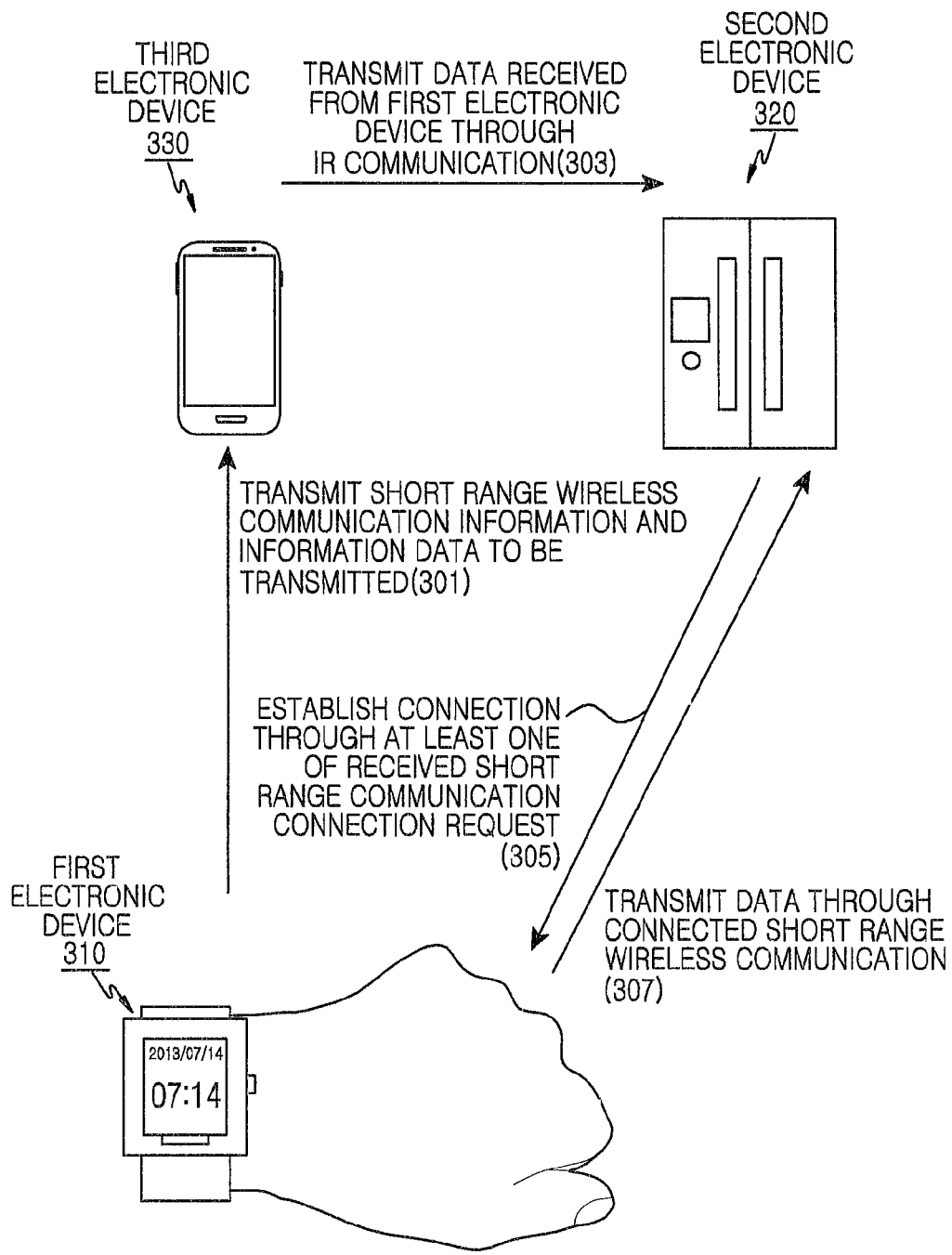

FIGS. 3A and 3B are views illustrating an operation for transmitting/receiving data in an electronic device according to an embodiment of the present invention.

The electronic device 100 can transmit/receiving data for short range wireless communication environment establishment with another electronic device through an IR communication in connection with an IR communication available auxiliary electronic device and can establish a short range wireless communication environment between the electronic device 100 and another electronic device on the basis of the transmitted/received data and can transmit/receive data through a short range wireless communication. Referring to FIGS. 3A and 3B, in describing various embodiments of the present invention, the electronic device 100 transmitting data to establish a short range wireless communication environment can be referred to as a first electronic device 310. The first electronic device 100 (for example, the above-mentioned auxiliary electronic device) connected to the first electronic device 310 and transmitting data transmitted from the first electronic device 310 through IR communication can be referred to as a third electronic device 330. The electronic device 100 receiving the transmitted data from the third electronic device 330 to establish a short range wireless communication environment with the first electronic device 310 can be referred to as a second electronic device 320.

Hereinafter, description is made with reference to FIG. 3A.

According to various embodiments of the present invention, the first electronic device 310 may not include an IR communication module. The first electronic device 310 can transmit data to the second electronic device 320 through an IR communication module of the third electronic device 330 (i.e., an auxiliary electronic device) connected through a short range wireless communication. According to an embodiment of the present invention, the first electronic device 310 is not limited to being connected to the third electronic device 330 through a short range communication and can be connected through various methods such as wired communication and mobile communication.

The data that the first electronic device 310 transmits to the second electronic device 320 can be data including at least one information for establishing a short range wireless communication environment with the second electronic device 320 and/or at least one short range wireless communication connection request. According to an embodiment of the present invention, the first electronic device 310 can require information on at least one second electronic device 320 to establish a short range wireless communication environment with the second electronic device 320. The first electronic device 310 can include a transmission request for at least one necessary information in data and then can transmit the data.

The third electronic device 330 can be connected to the first electronic device 310 through a short range wireless communication and can receive data that the first electronic device 310 plans to transmit to the second electronic device 330 and then can transmit the received data to the second electronic device 320 through IR communication instead of the first electronic device 310. According to an embodiment of the present invention, the first electronic device 310 can request at least one information for establishing a short range wireless communication environment with the second electronic device 320 from the second electronic device 320 by using the third electronic device 330 through IR communication. Then, the third electronic device 330 can transmit the received data from the second electronic device 320 to the first electronic device 310 through a short range wireless communication.

In order to transmit the received data from the first electronic device 310 to the second electronic device 320, the third electronic device 330 can perform an operation for matching a signal transmission direction of an IR communication module of the third electronic device to a signal reception area of an IR communication module of the second electronic device 320.

The second electronic device 320 can receive data that the third electronic device 330 transmits through IR communication. The data that the first electronic device 310 transmits through the third electronic device 330 can include at least one information for establishing a short range wireless communication environment with the second electronic device 320, at least one information request necessary for establishing a short range wireless communication with the second electronic device 320, or a short range wireless communication connection request to at least one second electronic device 320. According to an embodiment of the present invention, in order to transmit the information requested from the first electronic device 310, the second electronic device 320 can transmits the information to the third electronic device through IR communication and then, can allow the third electronic device 330 to transmit the information to the first electronic device 310. According to an embodiment of the present invention, in order to transmit information requested from the first electronic device 310, the second electronic device 320 accepts a short range wireless communication connection request and then transmits the information to the first electronic device 310 through a connected short range wireless communication.

Hereinafter, description is made with reference to FIG. 3B.

In operation 301, the first electronic device 310 can be connected to the third electronic device 330 through a short range wireless communication. According to an embodiment of the present invention, the first electronic device 310 is not limited to being connected to the third electronic device 330 through a short range communication and can be connected through various methods such as wired communication and mobile communication.

According to various embodiments of the present invention, the first electronic device 310 can transmit data to the second electronic device 320 through IR communication of the third electronic device 330. According to an embodiment of the present invention, data that the first electronic device 310 transmits to the third electronic device 330 can include identification information on at least one short range communication method available for the first electronic device 310 to establish a short range wireless communication environment with the second electronic device 320, connection information, and at least one short range wireless communication request information to configure a predetermined instruction transmitted/received to/from the second electronic device 320 through an IR module.

According to an embodiment of the present invention, as the second electronic device 330 accepts at least one of a plurality of short range wireless communication connection requests transmitted from the first electronic device 310, the first electronic device 310 can include information for requesting connection to connect (for example, pairing) to at least one accepted short range wireless communication with the first electronic device 310 to configure data. The first electronic device 310 can transmit data, which is generated to be transmitted to the second electronic device 320, to the third electronic device 330 through IR communication.

In operation 303, the third electronic device 330 can transmit the received data from the first electronic device 310 to the second electronic device 320 through IR communication. According to an embodiment of the present invention, when the first electronic device 310 determines a receiver of data as the second electronic device 320 and transmits the data, the third electronic device 330 can transmit the data to the second electronic device 320 through IR communication. According to an embodiment of the present invention, the third electronic device 330 can receive data from the first electronic device 310, and when the first electronic device 310 performs a predetermined operation or the first electronic device 310 and the third electronic device 330 perform a predetermined operation, the data received by the first electronic device 310 through IR communication can be transmitted to the second electronic device 320 through IR communication.

In operation 305, the second electronic device 320 can establish a short range wireless communication environment between the first electronic device 310 and the second electronic device 320 by accepting a connection request on at least one short range wireless communication methods available for the first electronic device 310 and the second electronic device 320 on the basis of the data received from the first electronic device 310.

According to various embodiments of the present invention, the method of establishing a short range wireless communication environment between the first electronic device 310 and the second electronic device 320 can be a method of requesting at least one short range wireless communication method from the first electronic device 310 on the basis of the data received from the second electronic device 320. According to an embodiment of the present invention, the first electronic device 310 includes information and instructions for connection request for at least one short range wireless communication method in data and transmits the data to the second electronic device 320. The second electronic device 320 can request a communication connection from the first electronic device 310 without additional control through at least one short range wireless communication method available for the second electronic device 320 according to the received data. The first electronic device 310 can accept a communication connection request received from the second electronic device 320 without additional control and can be connected to the second electronic device 320 through at least one short range wireless communication.

According to various embodiments of the present invention, according to the method described in operation 203 of FIG. 2C, the first electronic device 310 and the second electronic device 320 can be connected to each other through a short range wireless communication.

In operation 307, the first electronic device 310 can transmit data or request data transmission through at least one short range communication method available for the second electronic device 320. According to an embodiment of the present invention, when transmitting data to the second electronic device 320, the first electronic device 310 can use at least one short range communication method available for the second electronic device 320. According to an embodiment of the present invention, when requesting data transmission from the second electronic device 320, the first electronic device 310 can use at least one short range communication method available for the second electronic device 320 or an IR communication method.

Figure 4:
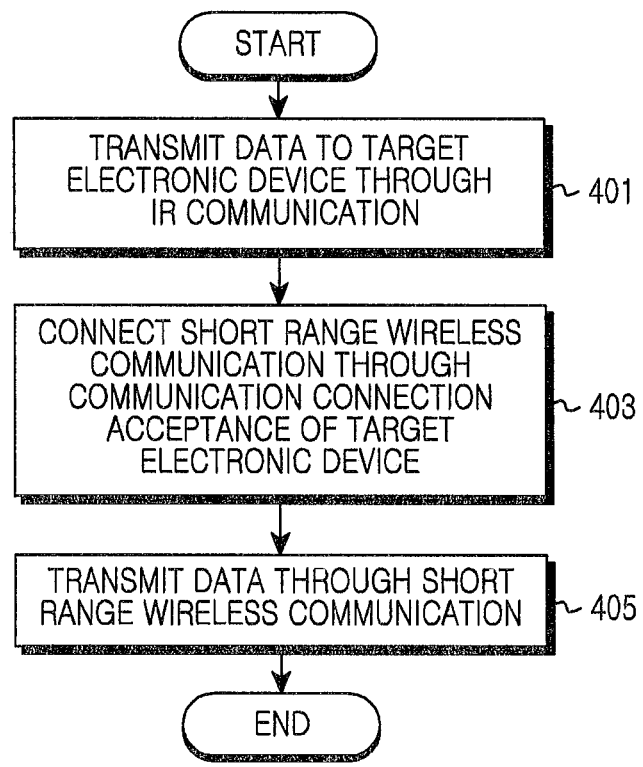
FIG. 4 is a flowchart illustrating data transmission in an electronic device according to an embodiment of the present invention.

FIG. 4 is a flowchart illustrating data transmission in an electronic device according to an embodiment of the present invention.

In operation 401, the electronic device 100 can transmit data including information configure to connect to a short range wireless communication to a target electronic device that is to be connected through a short range wireless communication, through IR communication.

According to various embodiments of the present invention, while data is transmitted/received to/from a target electronic device through IR communication, an IR communication signal can transmit/receive data when a signal transmission range of an IR communication module in the electronic device 100 corresponds to a signal reception area of an IR communication module in a target electronic device. In transmitting/receiving data through IR communication, when a transmission range of a signal is not matched, a target electronic device may not receive the data transmitted from the electronic device 100. According to an embodiment of the present invention, a method of matching a signal transmission range of an IR communication module in the electronic device 100 with a signal reception area of an IR communication module in a target electronic device can be an operation for pointing the IR communication module of the target electronic device with the IR communication module of the electronic device 100.

According to various embodiments of the present invention, the electronic device 100 can determine transmitting data including at least one instruction for allowing a target electronic device to connect to the electronic device 100 through a short range wireless communication by using IR communication when a predetermined motion and/or gesture is detected. According to an embodiment of the present invention, the electronic device 100 can transmit data to the target electronic device through IR communication according to a predetermined method (for example, an input means such as a preset touch pen, a predetermined part of the body, and a predetermined ring or an input through an auxiliary electronic device). Herein, an operation for transmitting data through IR communication determines a receiver as a target electronic device but this is just for clarifying a transmission relationship in describing various embodiments of the present invention. For example, the electronic device 100 can transmit data without setting a specific target electronic device receiving data transmitted from the electronic device 100. Since IR communication can have a limited data transmission range and reception area, a target electronic device receiving data can be determined by controlling (for example, a pointing operation) a signal transmission direction of an IR communication module of the electronic device 100.

According to various embodiments of the present invention, the first electronic device 100 can transmit data through an IR communication module of an auxiliary electronic device. According to an embodiment of the present invention, the first electronic device 100 may not include an IR communication module. The electronic device 100 can be connected to an auxiliary electronic device including an IR communication module through at least one of various communication methods such as short range wireless communication, wired communication, and mobile communication, and can transmit data through an IR communication module of an auxiliary electronic device.

In operation 403, the electronic device 100 can establish a short range wireless communication environment with a target electronic device when the target electronic device receiving data accepts at least one short range wireless communication connection request on the basis of the transmitted data.

According to an embodiment of the present invention, the electronic device 100 can include connection request information through a short range communication in the data transmitted through IR communication in operation 401. The target electronic device receiving data can set at least one short range wireless communication environment with the electronic device 100 according to information included in the received data and can transmit/receive data through at least one connected short range wireless communication method, by accepting a connection request corresponding to at least one available short range wireless communication method.

According to an embodiment of the present invention, the electronic device 100 can include information controlling a short range communication connection request in the data transmitted through IR communication and then can transmit the data in operation 401. The target electronic device receiving data can request a short range wireless communication connection from the electronic device 100 through at least one available wireless communication method according to information in the received data. The electronic device 100 transmitting data including information for requesting a short range communication connection can accept at least one short range wireless communication connection request received from the target electronic device without additional control, set a short range wireless communication environment with the target electronic device, and transmit/receive data.

In operation 405, the first electronic device 100 can transmit data or request data transmission through at least one short range communication connected to the target electronic device. When scheduled data transmission is completed, the electronic device 100 can be disconnected from at least one short range wireless communication connected to the target electronic device. According to various embodiments of the present invention, the electronic device 100 may not perform operation 405 and can maintain a short range wireless communication connection with the other party electronic device.

Figure 5:
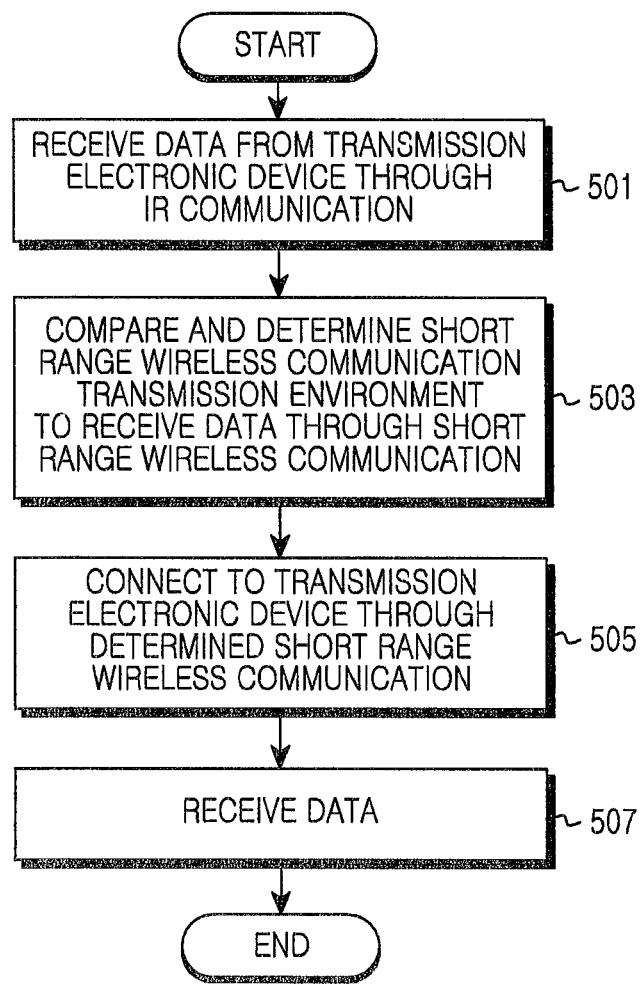
FIG. 5 is a flowchart illustrating data transmission in an electronic device according to an embodiment of the present invention.

FIG. 5 is a flowchart illustrating data transmission in an electronic device according to an embodiment of the present invention.

According to various embodiments of the present invention, in describing FIG. 5, the name of another electronic device transmitting/receiving data to/from the electronic device 100 can be referred to as the other party electronic device. The electronic device 100 can connect to the other party electronic device through at least one short range wireless communication method and can transmit/receive data to/from the other party electronic device according to the data received from the other party electronic device. According to an embodiment of the present invention, the electronic device 100 is not limited to transmitting/receiving data to/from an electronic device of the other party and can transmit/receive data to/from at least one electronic device of the other party. In describing FIG. 5, in order to describe 1:1 communication relationship clearly, another electronic device transmitting/receiving data to/from the electronic device 100 can be described as the above-mentioned electronic device of the other party.

In operation 501, the electronic device 100 can receive data through a reception area of an IR communication module. The data that the electronic device 100 receives can be data transmitted for communicating with the electronic device 100 through at least one short range wireless communication method.

According to various embodiments of the present invention, the data that the electronic device 100 receives can include at least one of identification information on the other party electronic device transmitting data, identification information on at least one short range wireless communication module in the other party electronic device, a connection request on at least one short range wireless communication, and information including an instruction controlling a connection through at least one short range wireless communication. The electronic device 100 can connect to the other party electronic device transmitting data through at least one short range wireless communication method according to the received data.

According to an embodiment of the present invention, the electronic device 100 can confirm connection request information through a short range communication on the basis of the received data. The electronic device 100 receiving the data can establish at least one short range wireless communication environment with the other party electronic device according to information in the received data by accepting a connection request corresponding to at least one available short range wireless communication method.

According to an embodiment of the present invention, it is confirmed that the electronic device 100 can include information for requesting a short range communication connection from the other part electronic device transmitting the data on the basis of the received data. The electronic device 100 receiving data can request a short range wireless communication connection from the other party electronic device through at least one available wireless communication method according to information in the received data. The other party electronic device can accept at least one received short range wireless communication connection request from the electronic device 100 without additional control and can set a short range wireless communication environment with the other party electronic device.

In operation 503, as the first electronic device 100 is connected to the other party electronic device through at least one short range wireless communication, it can set a priority according to at least one short range wireless communication state.

According to an embodiment of the present invention, the electronic device 100 can determine a connection priority on one of a turned-on short range wireless communication module, a wireless communication module having a fast transmission speed or reception speed among short range communication modules having confirmed transmission speeds, a short range wireless communication module having a fast response speed when test data (for example, packet data) is transmitted to the other party electronic device according to at least one condition.

According to an embodiment of the present invention, when the received data includes information on data to be transmitted when the other party electronic device is connected to the electronic device 100 through a short range wireless communication, the electronic device 100 can determine a priority on a short range wireless communication method configure to connect to the other party electronic device according to the size of data to be transmitted.

In operation 505, the electronic device 100 can connect to the other party electronic device through at least one short range wireless communication method according to the received data.

According to an embodiment of the present invention, the electronic device 100 can confirm connection request information through a short range communication on the basis of the received data and can be connected to the other party electronic device by accepting a connection request corresponding to at least one available short range wireless communication method.

According to an embodiment of the present invention, the electronic device 100 can confirm connection request information through a short range communication on the basis of the received data and can be connected to the other party electronic device by accepting a connection request corresponding to at least one available short range wireless communication method.

In operation 507, the first electronic device 100 can receive data transmitted from the other party electronic device or request data transmission through at least one short range wireless communication connected to the other party electronic device. When scheduled data transmission is completed, the electronic device 100 can be disconnected from at least one short range wireless communication connected to the other party electronic device. According to various embodiments of the present invention, the electronic device 100 may not perform operation 507 and can maintain a short range wireless communication connection with the other party electronic device.

According to various embodiments of the present invention, the electronic device 100 can transmit data including information for a short range wireless communication connection with the other party electronic device that is not connected through a short range wireless communication, through IR communication. The other party electronic device can establish a short range wireless communication environment with the electronic device 100 through IR communication on the basis of the received data.

Various embodiments of the present invention can be implemented by at least one program in the memory 110 of the electronic device 100 or can be directly controlled by a processor or can be controlled by a communication control module (not shown) receiving an instruction of a processor. According to an embodiment of the present invention, some or all functions of a communication control module (not shown) can be included in a processor and configured.

Methods according various embodiments listed in claims or the specification can be implemented using hardware, software or a combination thereof. In the case of software implementation, a computer readable recording medium storing at least one program (or software module) can be provided. At least one program stored in a computer readable recording medium is configured to be executable by at least one processor in the electronic device 100. At least one program can include an instruction for executing methods according to various embodiments listed in claims or the specification of the present invention.

According to various embodiments, a method of operating an electronic device includes confirming information on a short range wireless communication on the basis of first data received through IR communication, connecting to the other party electronic device transmitting the first data through a short range wireless communication on the basis of the first data, and transmitting/receiving second data to/from the other party electronic device on the basis of the first data. According to an embodiment of the present invention, the information can include information for requesting at least one short range wireless communication connection from an electronic device receiving the first data or information for allowing the electronic device receiving the first data to request at least one short range wireless communication connection from the other party electronic device transmitting the first data. According to an embodiment of the present invention, a connection operation can be performed based on a priority on a short range wireless communication. According to an embodiment of the present invention, the priority can be determined based on information obtained by transmitting/receiving test data (for example, packet data) to/from the other party electronic device, information on a signal intensity between the electronic device and the other party electronic device, information on a turned-on short range wireless communication module, and information on a pre-stored transmission speed, with respect to each short range wireless communication method provided from an electronic device.

Such a program (or software module) can be stored in nonvolatile memory ROM including random access memory and flash memory, electrically erasable programmable read only memory (EEPROM), a magnetic disk storage device, compact disk (CD)-ROM, digital versatile discs (DVDs), another type of optical storage device, or a magnetic cassette. Or, such a program can be stored in a memory configured with a combination of some or all of the above. Additionally, each configuration memory can be included in plurality.

Additionally, such a program can be stored in an attachable storage device accessing the electronic device 100 through a communication network of internet, intranet, LAN, WLAN, SAN, a combination thereof. Such a storage device can access the electronic device 100 through an external port. Additionally, an additional storage device on network can access the portable electronic device 100.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method in an electronic device, the method comprising:
    transmitting first data to an external device through infrared communication, the first data including information on a plurality of short range wireless communications other than the infrared communication, the plurality of short range wireless communications comprising a plurality of different types of short range wireless communications supported by the electronic device;
    receiving a request to connect a selected one of the plurality of short range wireless communications by the external device, wherein the selected one of the plurality of short range wireless communications is selected from the plurality of different types of short range wireless communications based on a priority of the plurality of different types of short range wireless communications;
    establishing a short range wireless communication with the external device based on a connection history between the electronic device and the external device and the plurality of short range wireless communications in the first data; and
    transmitting a second data to the external device through the established short range wireless communication.

2. The method of claim 1, further comprising:
    receiving a request configure to connect the short range wireless communication to the external device; and
    transmitting a connection acceptance response to the external device in response to the request configure to connect the short range wireless communication.

3. The method of claim 1, wherein the first data further comprises identification information on the electronic device.

4. The method of claim 1, wherein the plurality of short range wireless communications are prioritized for connection according to at least one of:
    information obtained by transmitting and/or receiving test data to and/or from a second external device,
    information on signal intensity between the electronic device and the second external device,
    information on a turned-on short range wireless communication module, or
    information on a pre-stored transmission speeds of short range wireless communications supported by the electronic device.

5. The method of claim 1, further comprising:
    entering the first data into the electronic device through a predetermined input means.

6. The method of claim 5, wherein the predetermined input means is at least one of a touch pen, a motion of part of a body, or an accessory device.

7. The method of claim 1, wherein the first data further comprises information on whether there is data that the electronic device transmits to the external device or whether there is data that the electronic device receives from the external device.

8. The method of claim 1, wherein the first data comprises a connection request message to establish a connection through a short range wireless communication method that the electronic device provides.

9. The method of claim 1, wherein transmitting the second data further comprises automatically transmitting the second data once the short range wireless communication is connected.

10. A method, comprising:
    transmitting a first data to a first external device through infrared communication, the first data including information on a short range wireless communication other than the infrared communication, the short range wireless communication being supported by an electronic device; and
    establishing the short range wireless communication with a second external device on a basis of the first data, a priority of different types of short range communication mediums, and a connection history between the electronic device and the second external device, wherein the second external device is configured to receive the information on the short range wireless communication from the first external device.

11. The method of claim 10, wherein the first data comprises a connection request message to establish a connection through a short range wireless communication method that the electronic device provides.

12. The method of claim 10, wherein a plurality of short range wireless communications are prioritized for connection according to at least one of:
    information obtained by transmitting and/or receiving test data to and/or from the second external device,
    information on signal intensity between the electronic device and the second external device,
    information on a turned-on short range wireless communication module, or
    information on a pre-stored transmission speeds of short range wireless communications supported by the electronic device.

13. An electronic device, comprising:
    at least one short range wireless communication module configured to transmit and/or receiving data to and/or from an external device;
    a memory configured to store the data transmitted and/or received to and/or from the external device; and
    at least one processor configured to:
        transmit first data to the external device through infrared communication, the first data including information on a plurality of short range wireless communications other than the infrared communication, the plurality of short range wireless communications comprising a plurality of different types of short range wireless communications supported by the electronic device;
        receive a request to connect a selected one of the plurality of short range wireless communications by the external device, wherein the selected one of the plurality of short range wireless communications is selected from the plurality of different types of short range wireless communications based on a priority of the plurality of different types of short range wireless communications;
        establish a short range wireless communication with the external device based on a connection history between the electronic device and the external device and the plurality of short range wireless communications in the first data; and
        transmit second data to the external device through the established short range wireless communication.

14. The electronic device of claim 13, wherein the at least one processor is configured to:
    receive a request configure to connect the short range wireless communication to the external device; and transmit a connection acceptance response to the external device in response to the request configure to connect the short range wireless communication.

15. The electronic device of claim 13, wherein the first data is entered into the electronic device by a user.

16. The electronic device of claim 15, wherein the first data is entered through at least one of a touch pen, a motion of a part of a body, or an accessory device.

17. The electronic device of claim 13, wherein the first data comprises information on whether there is data that the electronic device transmits to the external device or whether there is data that the electronic device receives from the external device as the first data.

18. The electronic device of claim 13, wherein the first data comprises an instruction for establishing a connection through the short range wireless communication that the electronic device is configured to provide.

19. The electronic device of claim 13, wherein the second data is automatically transmitted once the short range wireless communication is connected.

20. The electronic device of claim 13, wherein the processor is configured to prioritize a plurality of short range wireless communications for connection according to at least one of:
- information obtained by transmitting and/or receiving test data to and/or from a second external device,
- information on signal intensity between the electronic device and the second external device,
- information on a turned-on short range wireless communication module, or
- information on a pre-stored transmission speeds of short range wireless communications supported by the electronic device.

* * * * *